United States Patent
Hsu

(10) Patent No.: US 7,759,588 B2
(45) Date of Patent: Jul. 20, 2010

(54) THIN KEYPAD ASSEMBLY

(75) Inventor: Chih-Ho Hsu, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 755 days.

(21) Appl. No.: 11/739,995

(22) Filed: Apr. 25, 2007

(65) Prior Publication Data

US 2008/0226375 A1   Sep. 18, 2008

(30) Foreign Application Priority Data

Mar. 14, 2007   (TW) ............................... 96108815 A

(51) Int. Cl.
  *H01H 9/26* (2006.01)
  *H01H 13/72* (2006.01)
  *H01H 13/76* (2006.01)
(52) U.S. Cl. ..................................... 200/5 A
(58) Field of Classification Search .................. 200/5 A
  See application file for complete search history.

(56) References Cited

U.S. PATENT DOCUMENTS 7,449,642 B1 * 11/2008 Wu et al. ..................... 200/5 A
7,523,544 B2 * 4/2009 Hsu ............................. 29/622
7,679,015 B2 * 3/2010 Cheng ........................ 200/310

FOREIGN PATENT DOCUMENTS

TW   M301397   11/2006
TW   M304441   1/2007

* cited by examiner

*Primary Examiner*—Michael A Friedhofer
*Assistant Examiner*—Lheiren Mae A Caroc
(74) *Attorney, Agent, or Firm*—Chun-Ming Shih; HDLS IPR Services

(57) ABSTRACT

A thin keypad assembly with a keypad panel of a smooth surface, a mist surface or a lines layer includes an elastic layer, a carrier and a keypad layer. The elastic layer includes a plurality of support portions, and each support portion has a protrusion. The carrier is installed on a surface of the elastic layer, and the joint surface of the carrier and the elastic layer sequentially includes a ground color layer, a function color layer and a font color layer. The keypad layer has a holder disposed on a surface of the carrier, and a plurality of protruding or flat keycaps are disposed on the holder, and a smooth surface is formed on the surface of the keycap, and the surface of the holder is a mist surface, or the surfaces of both keycap and holder are a lines layer.

25 Claims, 17 Drawing Sheets

THIN KEYPAD ASSEMBLY

BACKGROUND OF THE INVENTION

1. Field of the Invention

The present invention relates to a keypad assembly, and more particular to a thin keypad assembly.

2. Description of Prior Art

In addition to the function of a mobile phone, consumers also take other factors including the innovative appearance and the compact size of the mobile phone into consideration for the purchase the mobile phone. Therefore, some mobile phones print color patterns on the housing or keypad or produce three-dimensional lines directly on the housing of the mobile phone to improve the added-value of the product and promote the purchasing desire of the consumers.

Referring to FIG. 1A and a traditional way of producing three-dimensional lines as disclosed in R.O.C. Pat. No. M304441, the patented technology discloses a manufacturing method of a thin keypad assembly that attaches a first transparent layer 2a onto a substrate 1a, a first color layer 3a and a color opening area 31a onto the first transparent layer 2a, a second transparent layer 4a onto the first color layer 3a, and a second color layer 5 onto the second transparent layer 4a for providing an external look with different colors and lines for the depth of field by the aforementioned display structure and mode for the requirement of different visual appearances or functions. However, such manufacturing method takes too much time and efforts, and thus incurring a high manufacturing cost of the product easily.

Referring to FIG. 1B and R.O.C. Pat. No. M301397 for another keypad assembly with lines manufactured therein, a lines layer 1b is included between a thin film layer 2b and an elastic layer 3b for producing a flare effect. Since a lines layer 1b is created between the thin film layer 2b and the elastic layer 3b, therefore such patented technology not only adds more steps to the production or manufacturing procedure, but also consumes much manufacturing time and increases the thickness of the keypad. Obviously, an increased thickness is a disadvantage to the design of a thin film keypad.

SUMMARY OF THE INVENTION

In view of the foregoing shortcomings of the prior art, the inventor of the present invention based on years of experience in the related industry to conduct experiments and modifications, and finally developed a thin keypad assembly in accordance with the present invention.

Therefore, it is a primary objective of the present invention to provide a thin keypad assembly manufactured by a manufacturing a keypad in a mold while forming a smooth surface, a mist surface or a lines layer directly on the surface of the keypad panel or keycaps. The invention not only simplifies the manufacturing procedure and time, but also avoids an increased thickness of the keypad assembly.

To achieve the foregoing objective, the thin keypad assembly of the invention comprises: an elastic layer, a carrier and a keypad layer. The elastic layer includes a plurality of support portions and a protrusion between the support portions. The carrier is disposed on the surface of the elastic layer, and the joint surface of the carrier and the elastic layer sequentially includes a ground color layer, a function color layer and a font color layer. The surface of the carrier has a keypad layer, and the keypad layer has a holder, and the surface of the holder has a plurality of protruding or flat keypads, wherein the surface of the keycap is a smooth surface, and the surface of the holder is a mist surface, or both surfaces of the keycap and the holder are lines layers.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1A:
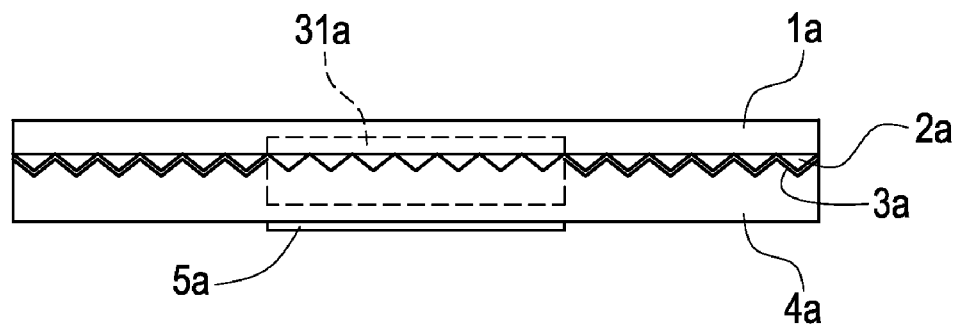
FIG. 1A is a schematic view of an appearance of an assembly of a conventional product.
Figure 1B:
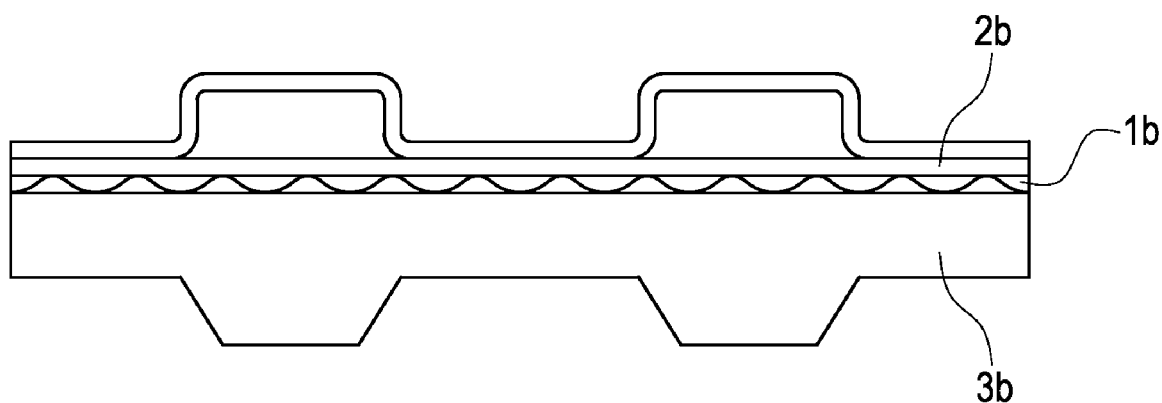
FIG. 1B is a schematic view of a conventional keypad assembly.
Figure 2A:
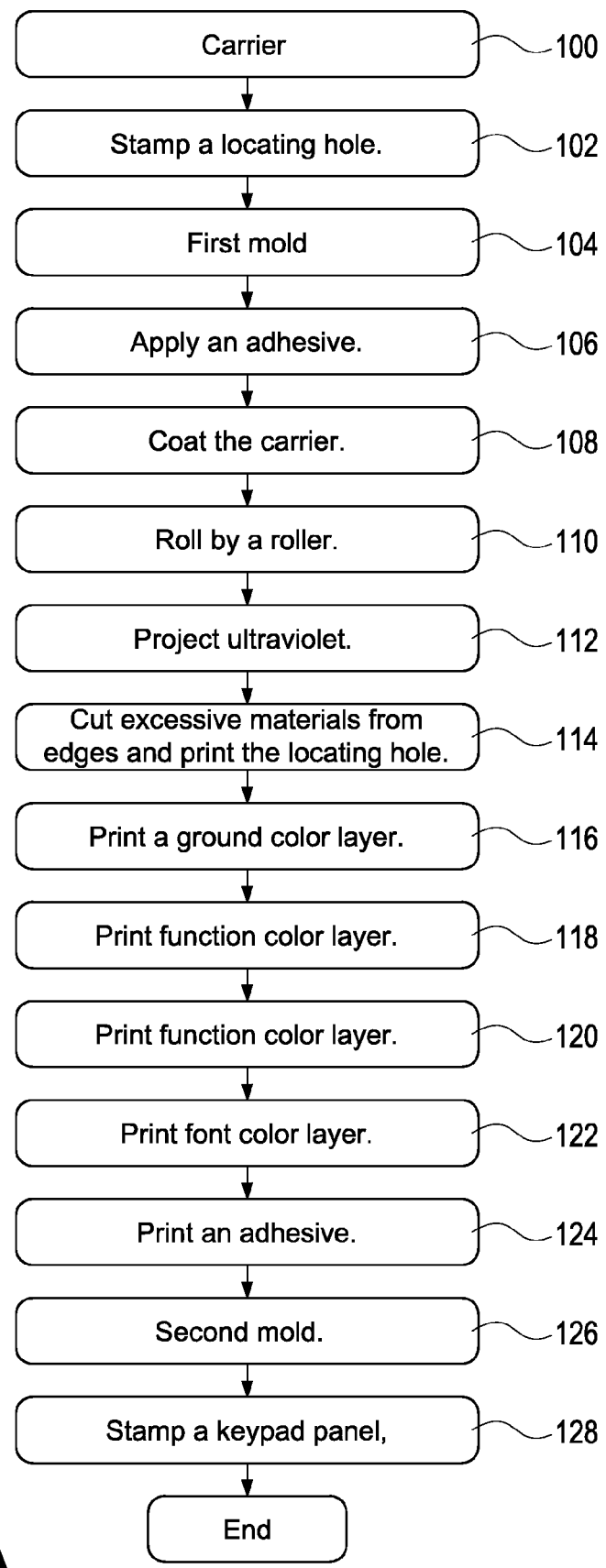
FIG. 2A is a flow chart of manufacturing a first type of thin film keypad in accordance with the present invention.

Referring to FIG. 2A for a flow chart of manufacturing a thin film keypad of the present invention, the manufacturing method provided for manufacturing a keypad assembly with patterned keycaps comprises the following steps:

Step 100: Prepare a carrier 2 made of a Polycarbonate film.

Figure 3:
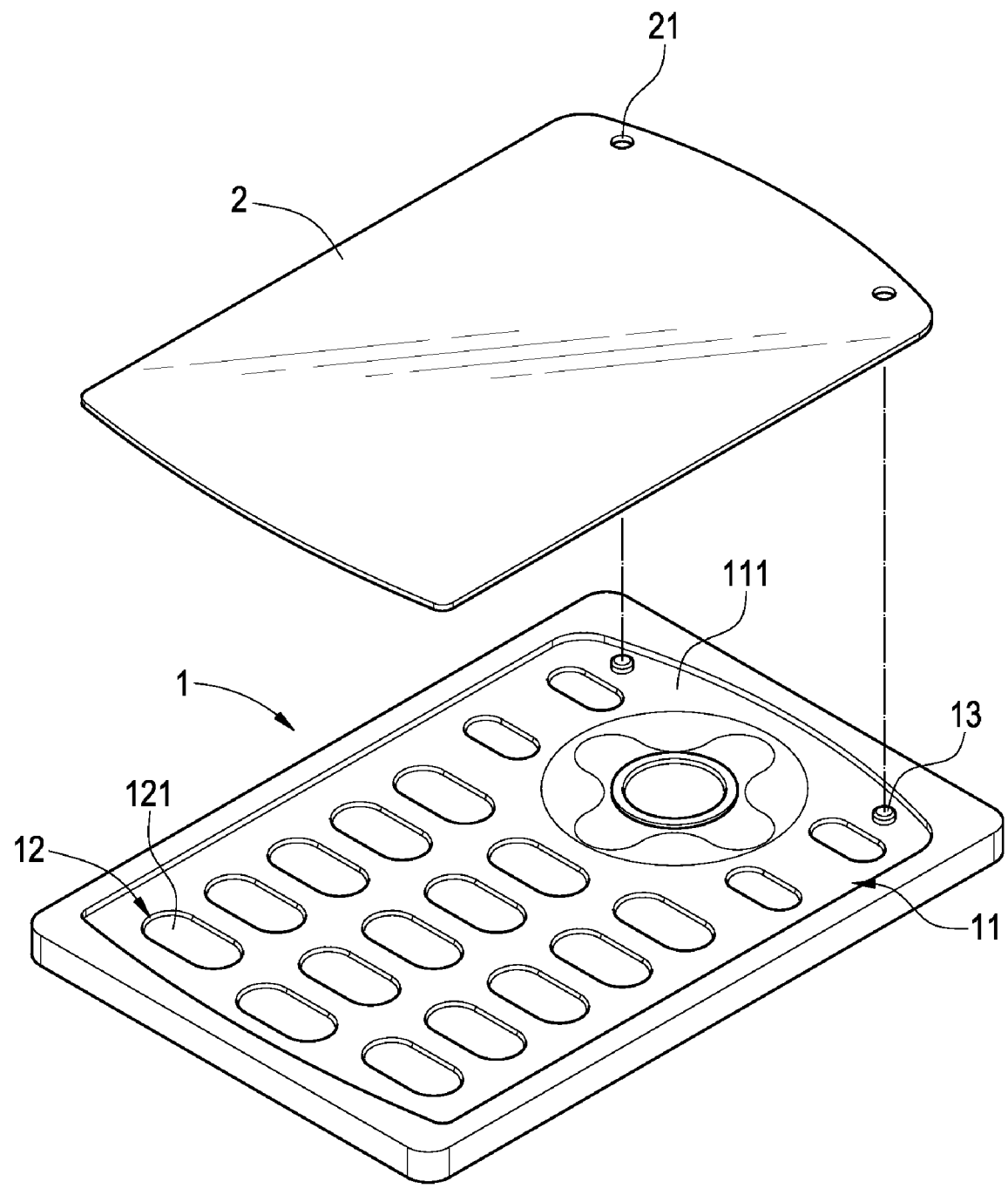
FIG. 3 is a schematic view of a carrier of the present invention.

Step 102: Stamp a locating hole 21 at the surface of the carrier 2 (see FIG. 3), wherein the locating hole 21 is provided for the carrier 2 to be positioned with a guiding pillar 13 of a first mold 1.

Figure 4:
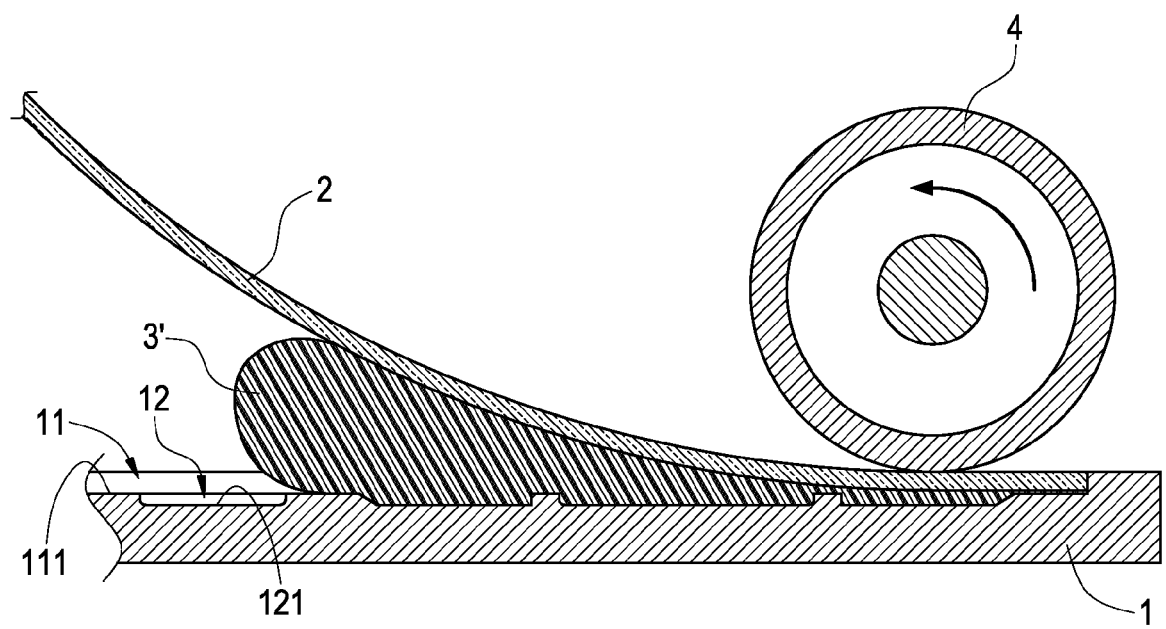
FIG. 4 is a schematic view of manufacturing a first type of first mold in accordance with the present invention.

Step 104: Prepare the first mold 1 (see FIG. 4), wherein the first mold 1 contains a first mold cavity 11, and the first mold cavity 11 contains a plurality of second mold cavities 12, and the second mold cavities 12 are provided for forming the shape of the keycap, and the bottom surface 111 of the first mold cavity 11 is a coarse surface, and the bottom surface 121 of the second mold cavity 12 is a smooth surface.

Step 106: Apply an adhesive 3' into the first mold cavity 11 of the first mold 1 (See FIG. 4), wherein the adhesive 3' is a ultraviolet curable resin.

Step 108: Coat the carrier 2 onto the surface of the adhesive 3' (See FIG. 4).

Figure 5:
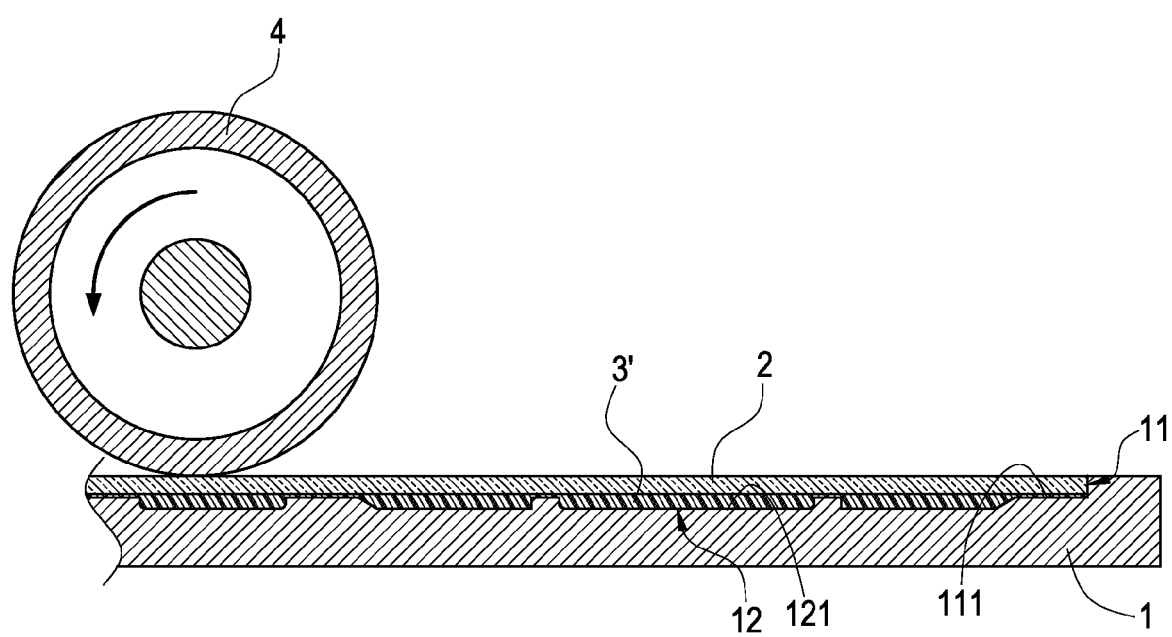
FIG. 5 is a schematic view of rolling a first mold as depicted in FIG. 4.

Step 110: Roll the surface of the carrier 2 by a roller 4 to fill up the adhesive 3' into the first and second mold cavities 11, 12, while squeezing the air among the adhesive 3', the first and second mold cavities 11, 12 and the carrier 2 to the outside to prevent any air bubble formed by the air remained in the adhesive 3' or between the adhesive 3' and the carrier 2 (see FIG. 5).

Step 112: Perform a ultraviolet projection to the rolled first mold 1 to cure the ultraviolet curable resin and form a keypad layer 3 by the adhesive 3'.

Step 114: Remove the keypad layer 3 and the carrier 2 from the first mold 1 and then cut away excessive materials at the edge and print a locating hole.

Figure 6:
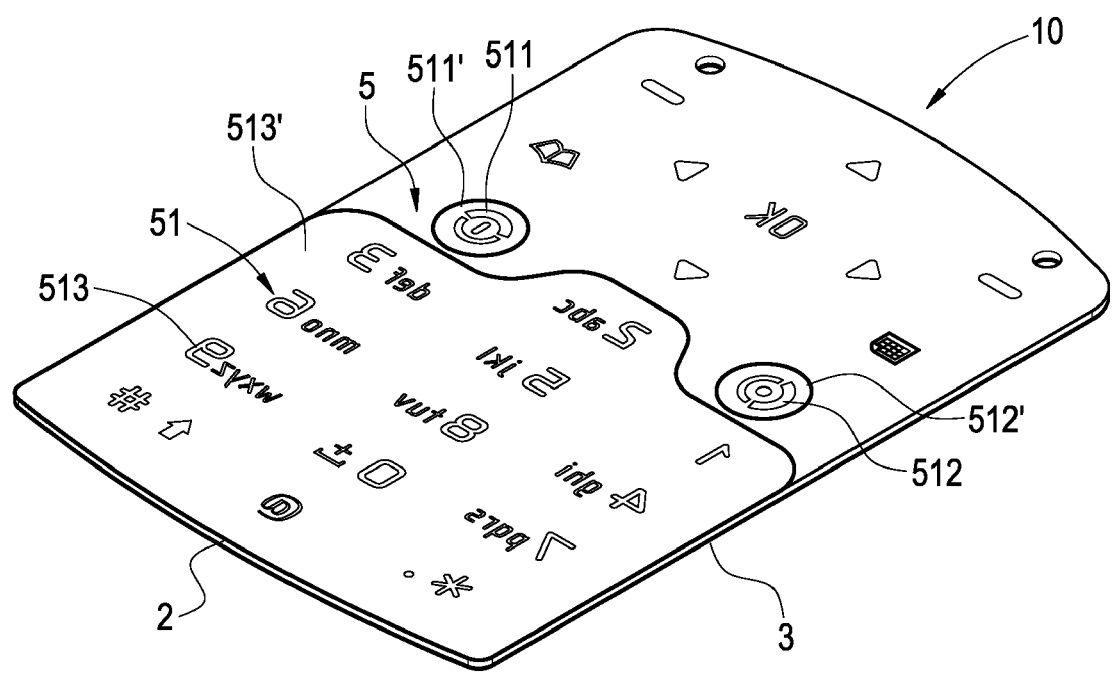
FIG. 6 is a schematic view of a backside printing of a keypad panel of the present invention.

Step 116: Print a black ink onto another surface of the carrier 2 to form a ground color layer 5 (see FIG. 6), while forming a pattern 51 of hollow characters, numbers or different symbols onto the ground color layer 5 corresponding to keycaps.

Step 118: Print a layer of red ink onto the surface of a pattern 511 of a hollow end key of the ground color layer 5 to form a function color layer 511' (See FIG. 6).

Step 120: Print a layer of green ink onto the surface of a pattern 512 of a hollow dialing key of the ground color layer 5 to form a function color layer 512' (See FIG. 6).

Step 122: Print a layer of white ink onto the surface of a pattern 513 of a hollow character and number key 513 of the ground color layer 5 to form a function color layer 513' (See FIG. 6), such that the font key 513 of the hollow characters and numbers is displayed in white color.

Figure 7:
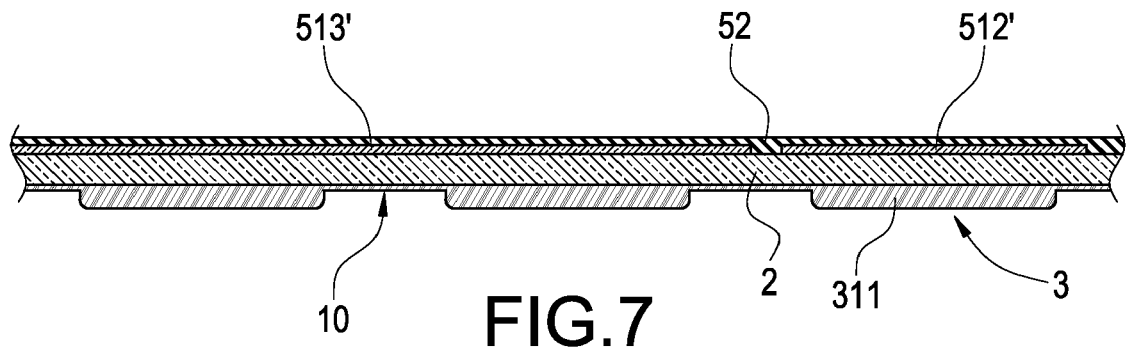
FIG. 7 is a side view of FIG. 6.

Step 124: Print a layer of glue 52 onto the surfaces of the ground color layer 5, the function color layer 511', 512' and the font color layer 513' (See FIGS. 6 and 7).

Figure 8:
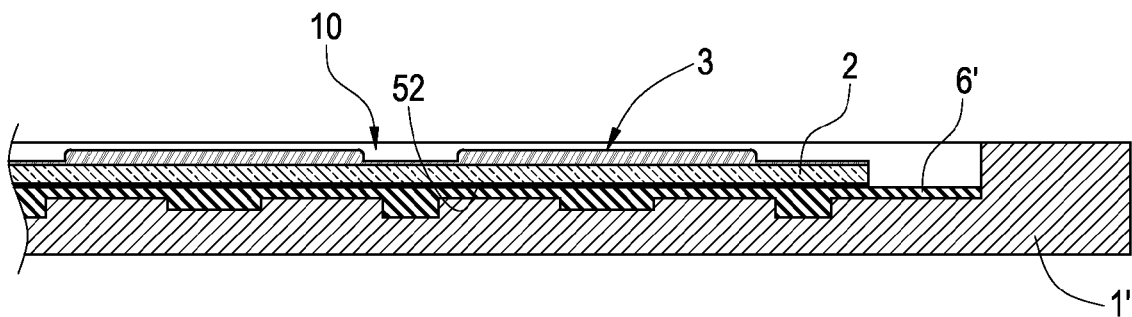
FIG. 8 is a schematic view of putting a keypad panel and silicon into a second mold in accordance with the present invention.
Figure 9:
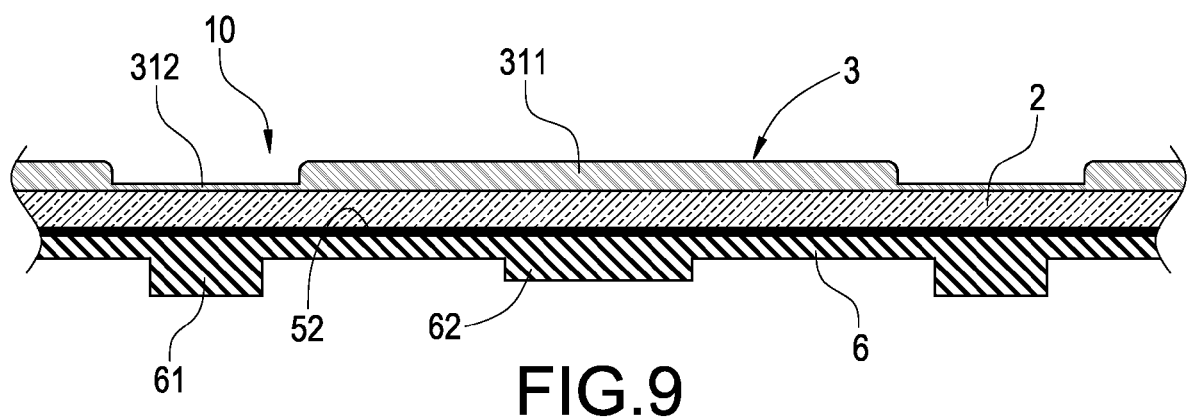
FIG. 9 is a side view of combining a keypad panel and an elastic layer in accordance with the present invention.

Step 126: Put the keypad layer 3, carrier 2 and silicon 6' simultaneously into the second mold 1' after the keypad panel is manufactured (See FIGS. 8 and 9), and combine the carrier 2 with silicon 6' by using a hot pressing technology, while forming an elastic layer 6 from the silicon 6, a support portion 61a on the elastic layer 6 and a protrusion 62 corresponding to the keycap.

Step 128: Remove the hot pressed keypad panel 10 and silicon 6' from the second mold 1', and stamp the external form of the keypad panel 10 to complete the manufacture of the keypad panel.

Figure 2B:
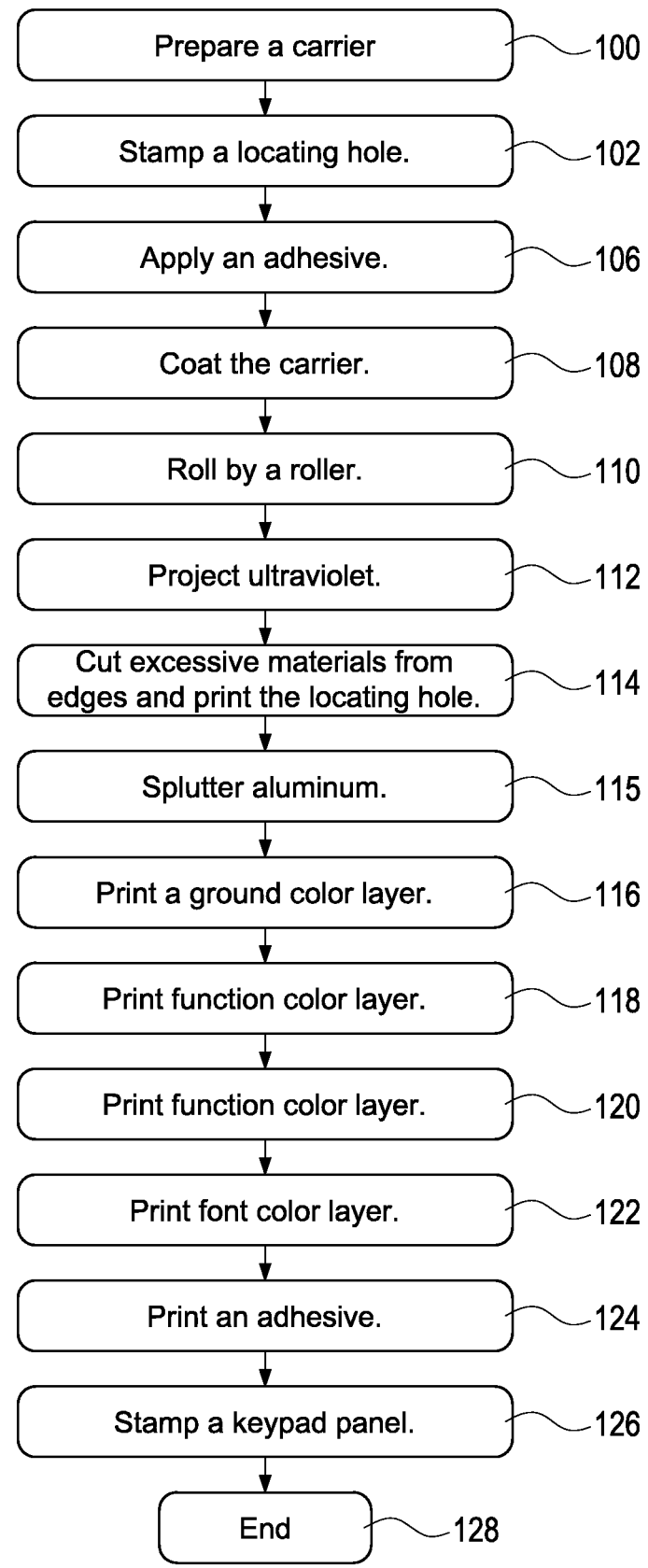
FIG. 2B is a flow chart of manufacturing a second type of thin film keypad in accordance with the present invention.

Referring to FIG. 2B for a flow chart of manufacturing a second type of thin film keypad, this manufacturing procedure is substantially the same as that illustrated in FIG. 2A, and the only difference resides on that Step 115 is added between Steps 114 and 116. In Step 115, an aluminum material with a light transmittance of approximately 40% is spluttered at the backside of the carrier 2 first before printing the ground color layer 5, so that the finished goods of the keypad panel can achieve the effect of a metal-like panel.

Figure 10:
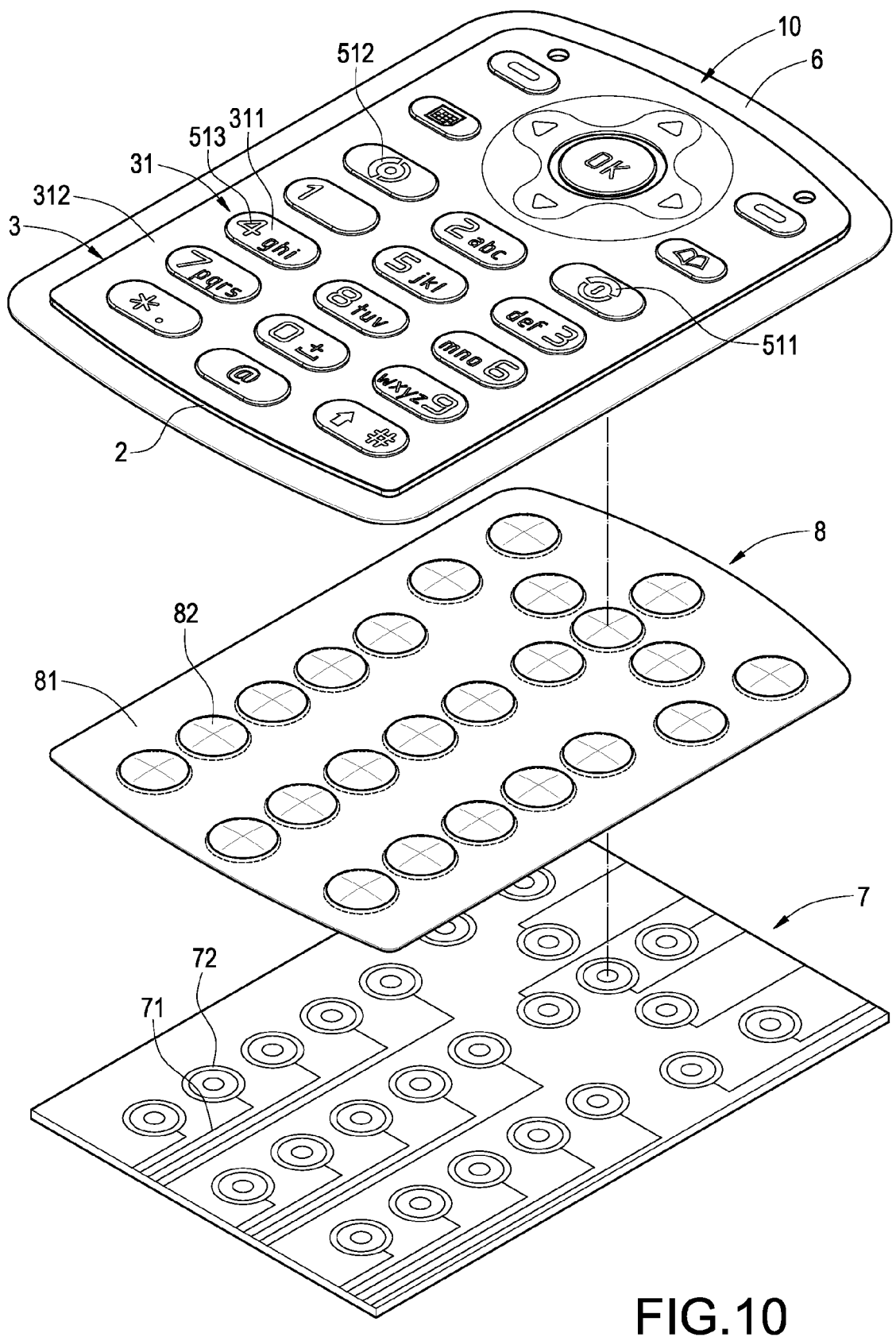
FIG. 10 is an exploded view of combining and using a keypad panel, a light emitting layer and a flexible printed circuit board in accordance with the present invention.

Referring to FIG. 10 for an exploded view of combining and using a keypad panel, a light emitting layer and a flexible printed circuit board in accordance with the present invention, the keypad assembly comprises a flexible printed circuit board 7, a light emitting layer 8, an elastic layer 6 and a keypad layer 3.

The aforementioned flexible printed circuit board 7 is a thin film flexible printed circuit board printed with a circuit 71 and a contact point 72.

The light emitting layer 8 includes a luminescent laminate 81 disposed on the surface of the flexible printed circuit board 7, and the luminescent laminate 81 as shown in FIG. 10 is an electro luminescent panel, and a plurality of metal domes 82 are disposed on another surface of the luminescent laminate 81, and the metal dome 82 is corresponding to the contact point 72 the flexible printed circuit board 7.

The elastic layer 6 is disposed on the light emitting layer 8 (See FIG. 11) and includes a support portion 61, and a protrusion 62 disposed between the support portions 61 and corresponding to the metal dome 82.

The keypad layer 3 includes a carrier 2 attached onto the surface of the elastic layer 6, and the carrier 2 includes a keypad group 31 comprised of a plurality of keycaps 311. Since the bottom surface 111 of the first mold cavity 11 is a coarse surface, and the bottom surface 121 of the second mold cavity 12 is a smooth surface, therefore the surface of the manufactured keycap 311 is a smooth surface, and the keycap 311 and the panel holder 312 connected to the keycap 311 have mist surfaces.

Figure 11:
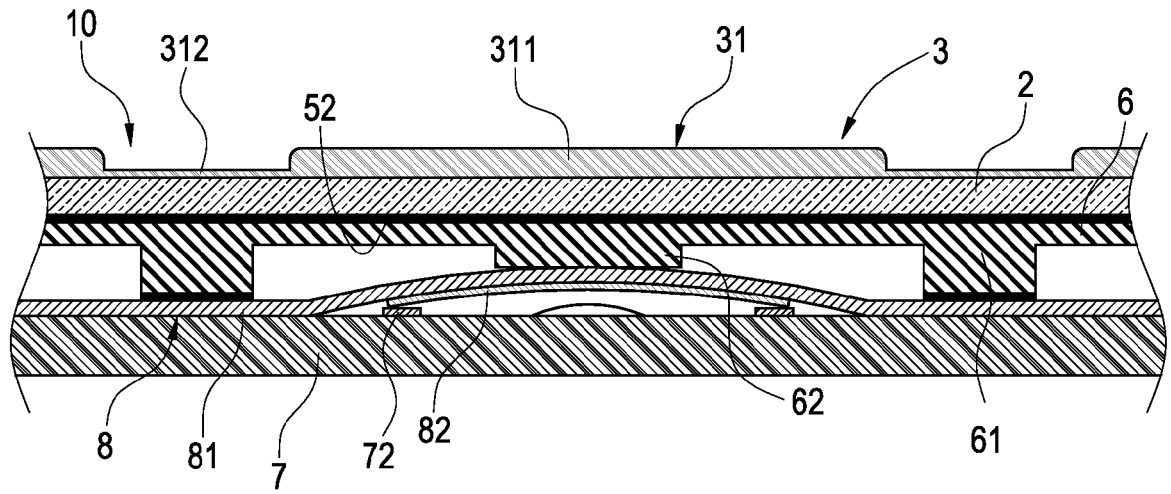
FIG. 11 is a side view of FIG. 10.
Figure 12:
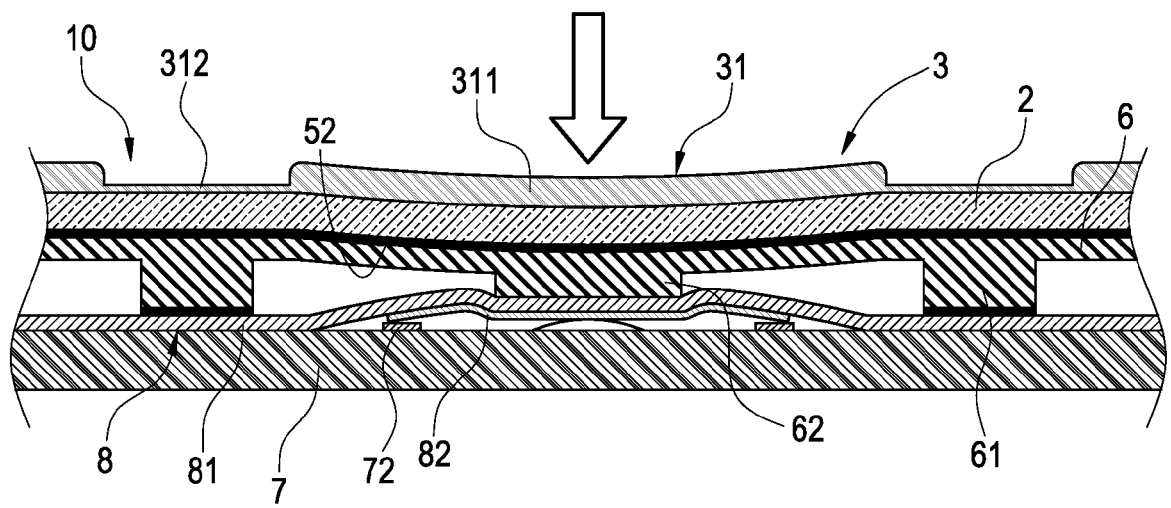
FIG. 12 is a schematic view of a pressing movement of FIG. 11.

Referring to FIGS. 11 and 12 for a side view of FIG. 10 and a schematic view of a pressing movement in accordance with the present invention respectively, a surface light source is produced by the luminescent laminate 81 of the light emitting layer 8 and projected directly onto the bottom of the elastic layer 6 when the keypad assembly is used. The light passes through the elastic layer 6 and the carrier 2, such that the surface of the keycap 311 of the keypad panel 3 shows a light transmitting effect.

When a user applies an external force to the surface of the keycap 311 to deform the carrier 2 and the elastic layer 6, the protrusion 62 is pressed against the surface of the luminescent laminate 81, and then the metal dome 82 is deformed to press the flexible printed circuit board 7 and touch the contact point 72, so as to produce an output of an operating signal.

Figure 13:
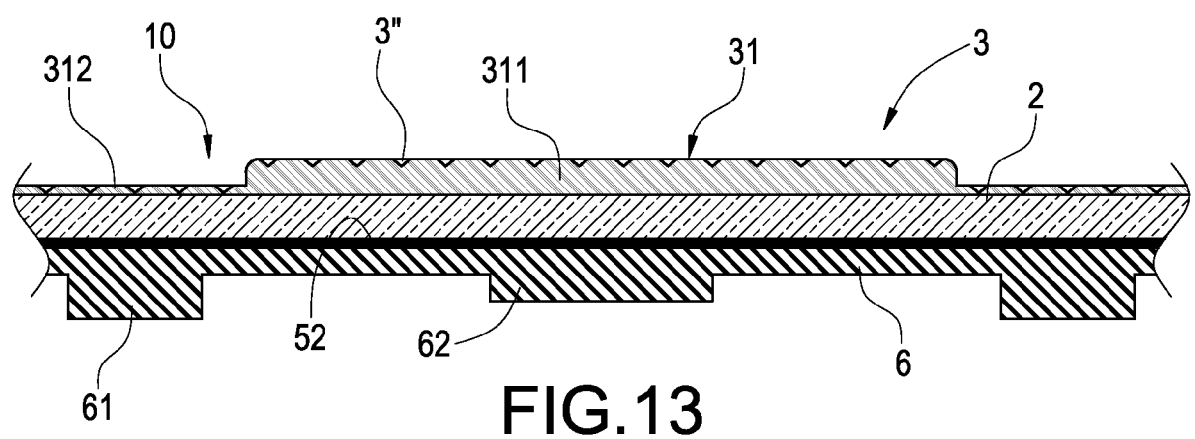
FIG. 13 is a side view of lines on a surface of a keypad panel of the present invention.
Figure 14:
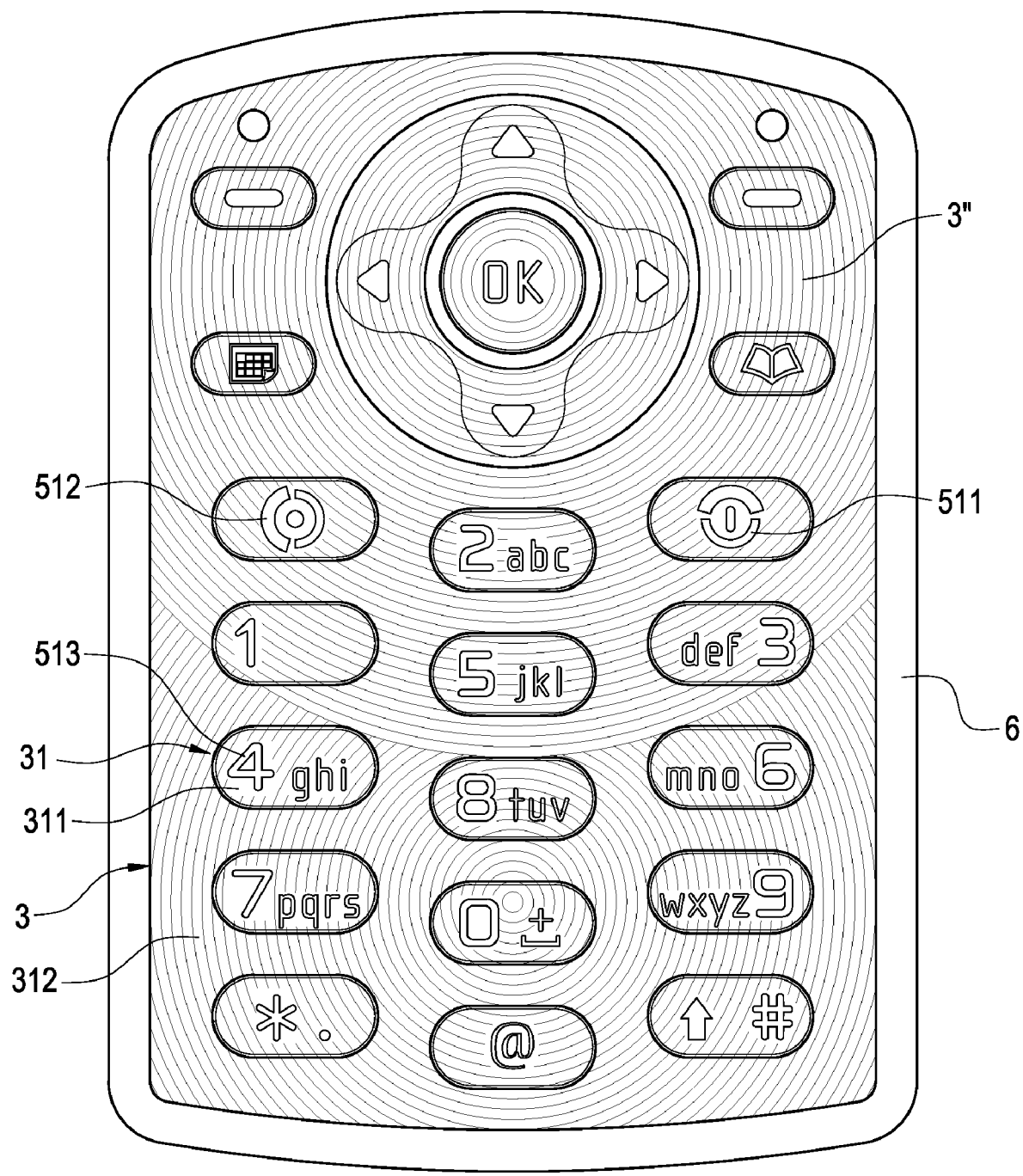
FIG. 14 is a front view of lines on a surface of a keypad panel of the present invention.
Figure 15:
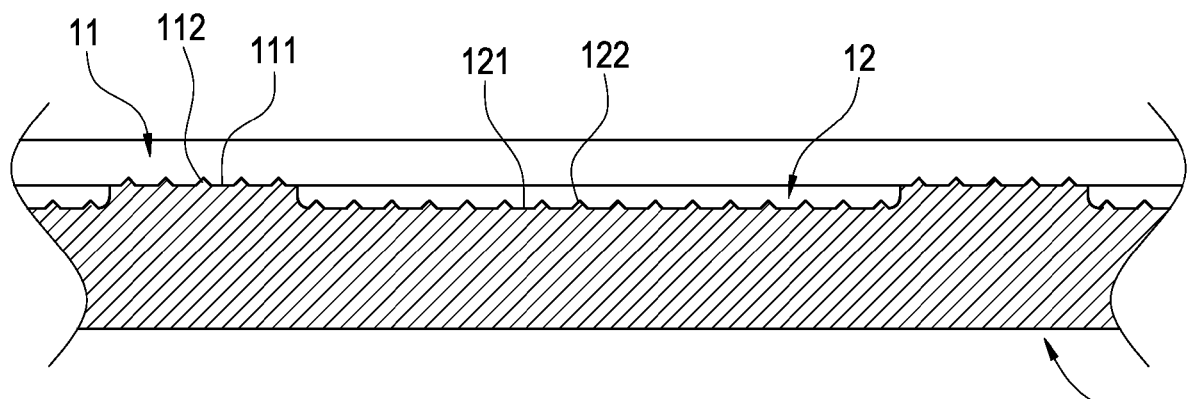
FIG. 15 is an enlarged view of a portion of a second type of first mold in accordance with the present invention.

Referring to FIGS. 13 and 14 for a side view and a front view of lines at the surface of the keypad panel of the present invention as well as FIG. 15 for an enlarged view of a portion of a second type of first mold in accordance with the present invention, lines 112, 122 are created on the bottom surfaces 111, 121 of the first mold cavity 11 and the second mold cavity 12 of the first mold 1 to form a lines layer 3" on the surfaces of the produced keycap 311 and panel holder 312 of the keypad panel 3. The lines as shown in these figures are spinnings, straight stripes or Archimedean screws.

Figure 16:
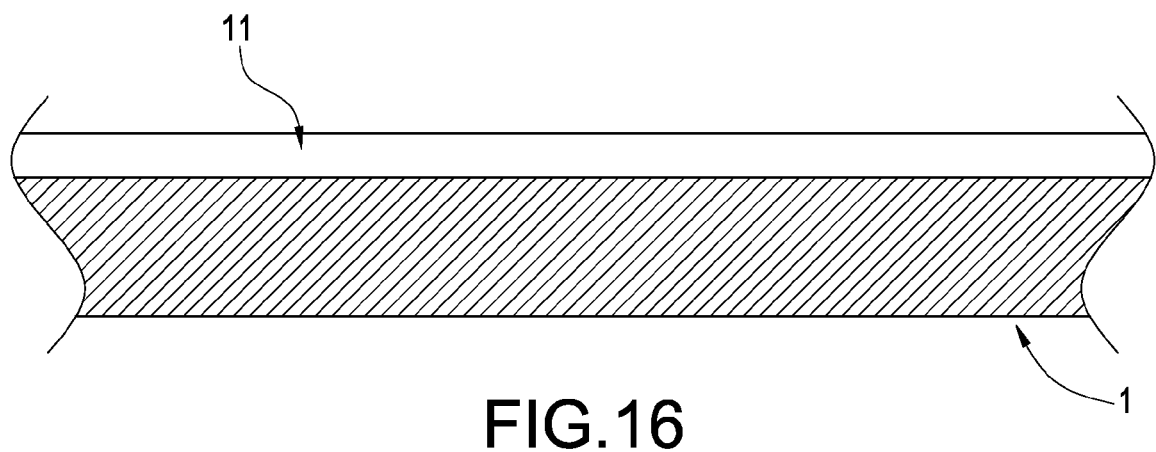
FIG. 16 is an enlarged view of a portion of a third type of first mold in accordance with the present invention.
Figure 17:
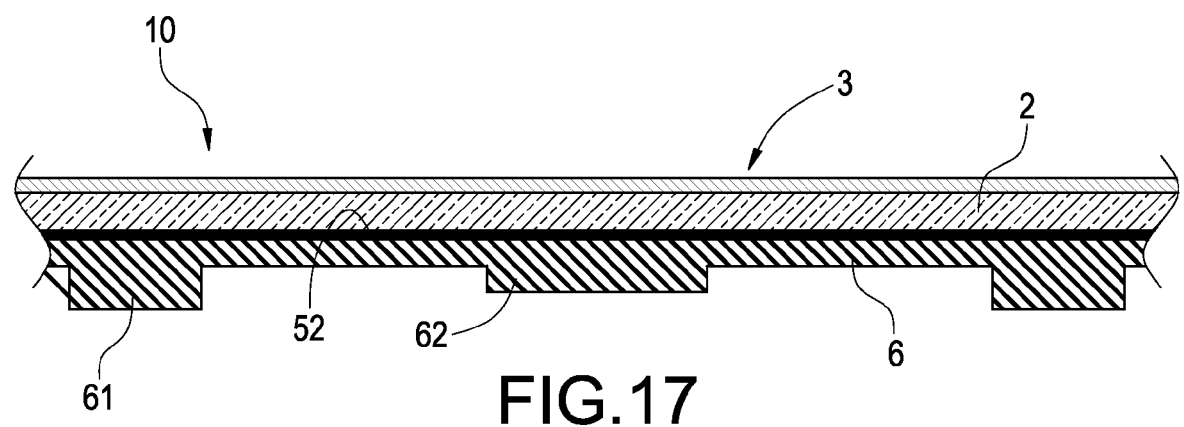
FIG. 17 is a side view of an assembled keypad panel of FIG. 16.

Referring to FIGS. 16 and 17 for an enlarged view of a portion of a third type of first mold in accordance with the present and a side view of a manufactured keypad panel of FIG. 16 respectively, if the first mold 1 does not contain a second mold cavity 12 in the first mold cavity 11, there will be no keycap 311 protruded from the surface of the keypad panel 3 when the keypad panel 3 is manufactured, such that the surface of the keypad panel 3 is a flat level surface.

Figure 18:
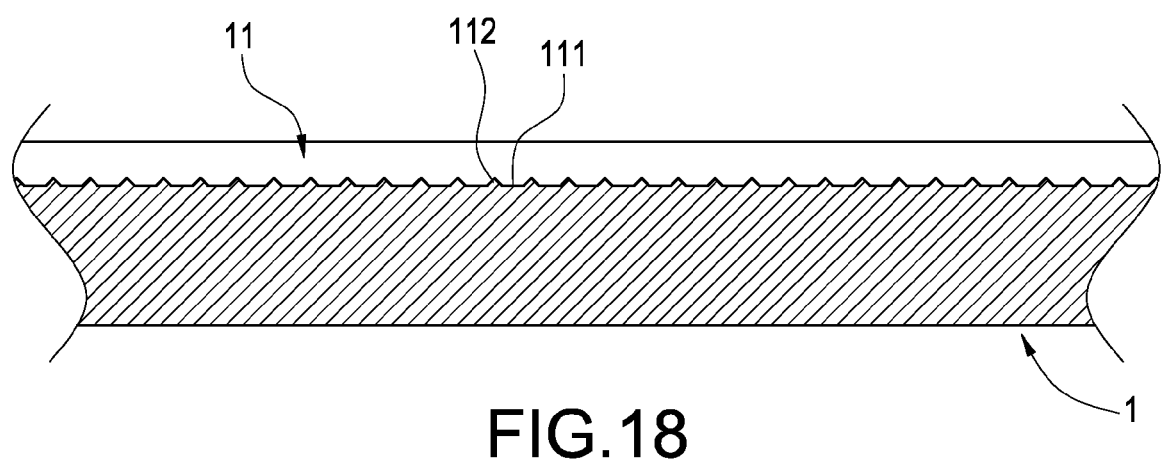
FIG. 18 is an enlarged view of a portion of a fourth type of first mold in accordance with the present invention.
Figure 19:
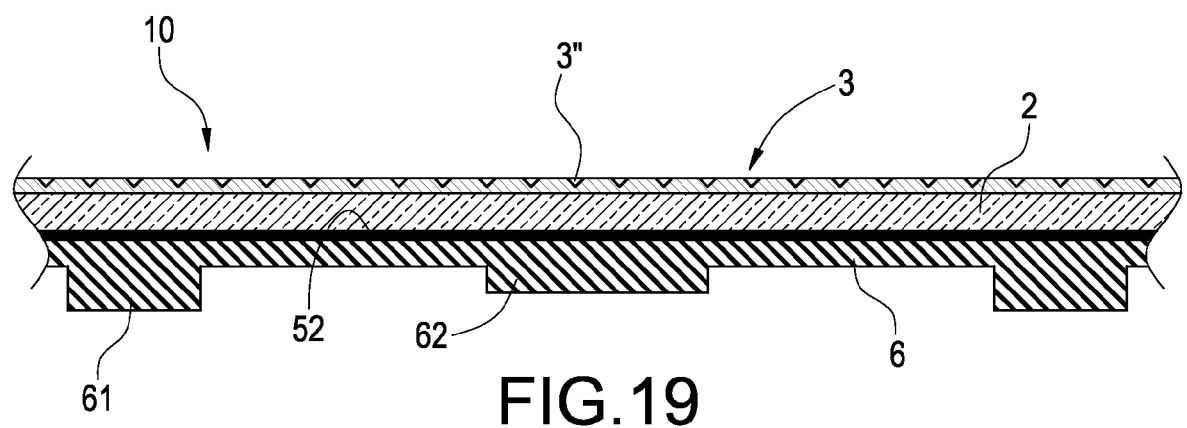
FIG. 19 is a side view of an assembled keypad panel of FIG. 18.

Referring to FIGS. 18 and 19 for an enlarged view of a portion of a fourth type of first mold in accordance with the present invention and a side view of a manufactured keypad panel of FIG. 18 respectively, the whole surface of the manufactured keypad panel 3 forms a lines layer 3″, if the bottom surface 111 of the first mold cavity 11 in the first mold 1 has lines 112. The lines illustrated in the figures are spinnings, straight stripes or Archimedean screws.

Figure 20:
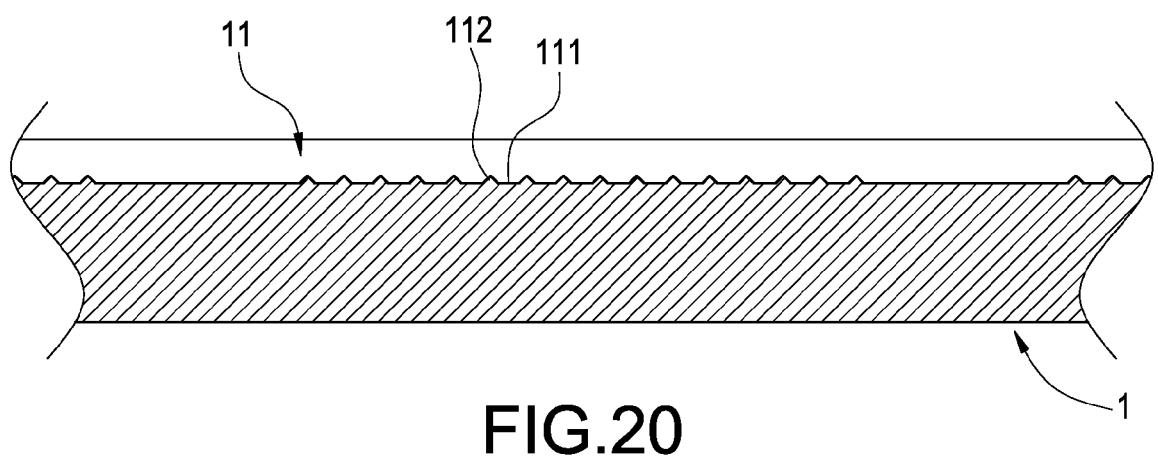
FIG. 20 is an enlarged view of a portion of a fifth type of first mold in accordance with the present invention.
Figure 21:
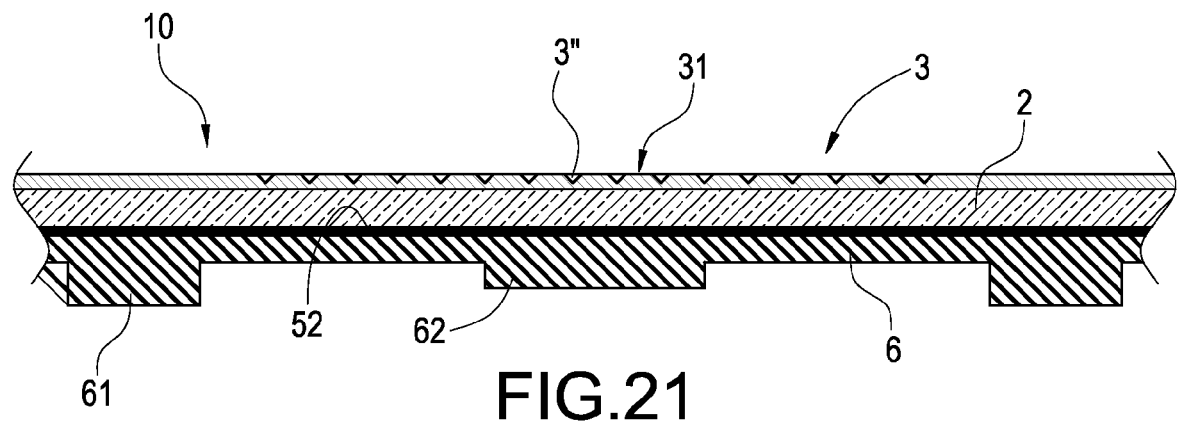
FIG. 21 is a side view of an assembled keypad panel of FIG. 20.

Referring to FIGS. 20 and 21 for an enlarged view of a portion of a fifth type of first mold in accordance with the present invention and a side view of a manufactured keypad panel of FIG. 20 respectively, a lines layer 3″ is formed on the flat surface of a keycap 311 of the manufactured keypad panel 3, if the bottom surface 111 of the first mold cavity 11 in the first mold 1 has lines 112 corresponding to the position of the keycap 311. The lines layer shown in the figure is a spinning, a straight stripe or an Archimedean screw.

Figure 22:
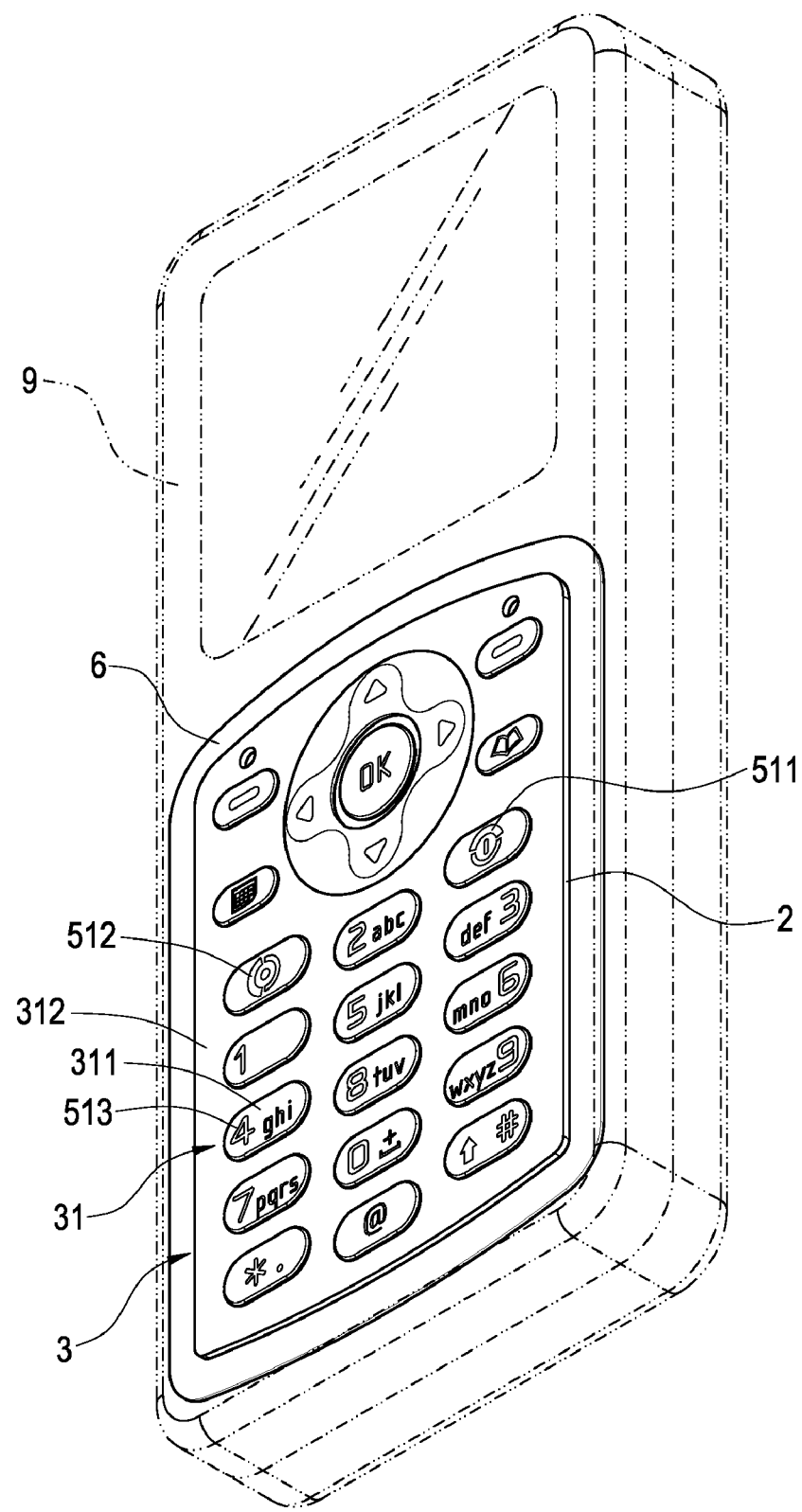
FIG. 22 is a schematic view of a keypad assembly applied in a mobile phone in accordance with the present invention.

Referring to FIG. 22 for a schematic view of a keypad assembly applied in a mobile phone in accordance with the present invention, the keypad assembly is installed to the mobile phone 9 for its use, the surface light source in the keypad assembly is projected directly onto the keypad panel 3, such that the surface of the keycap 311 of the keypad panel 3 shows a light transmitting effect.

Figure 23:
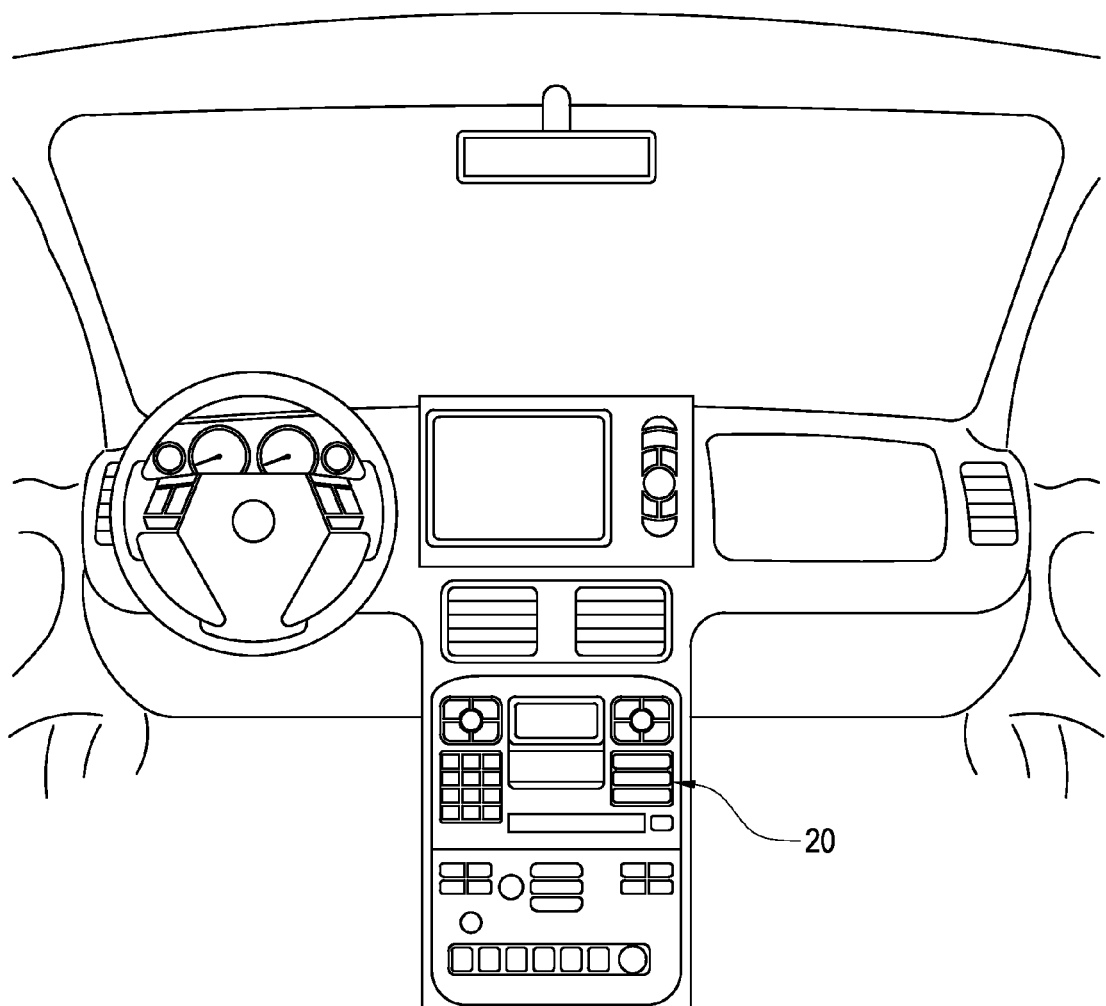
FIG. 23 is a schematic view of a keypad assembly applied in an automobile stereo panel in accordance with the present invention.

Referring to FIG. 23 for a schematic view of a keypad assembly applied in an automobile stereo panel in accordance with the present invention, the panel of the keypad assembly of the invention can be applied to a mobile phone, and also installed to the automobile stereo panel 20 for controlling an air-conditioning system, an audio/video system and a satellite navigation system, etc.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A thin keypad panel assembly, comprising:
   an elastic layer, having a plurality of support portions disposed thereon, and a protrusion disposed between the support portions;
   a carrier, disposed on a surface of the elastic layer, and a joint surface of the carrier and the elastic layer joint surface has a ground color layer, and the ground color layer has a function color layer, and the ground color layer and the function color layer have a font color layer; and
   a keypad layer, having a holder with a mist surface on a surface of the carrier, and the holder has a plurality of keycaps protruded from the surface of the holder and corresponding to the protrusion, and the surface of the keycap is a smooth surface.

2. The thin keypad panel assembly of claim 1, wherein the elastic layer is made of silicon.

3. The thin keypad panel assembly of claim 1, wherein the carrier is a transparent Polycarbonate film.

4. The thin keypad panel assembly of claim 1, wherein the ground color layer is a black ink, and the ground color layer forms a pattern of hollow characters, numbers or different symbols.

5. The thin keypad panel assembly of claim 1, wherein the function color layer is disposed on the pattern of a dialing key.

6. The thin keypad panel assembly of claim 1, wherein the function color layer is disposed on the pattern of an end key.

7. The thin keypad panel assembly of claim 1, wherein the font color layer is disposed on the pattern of hollow characters, numbers or different symbols.

8. The thin keypad panel assembly of claim 1, further comprising a light emitting layer installed under the elastic layer and having a luminescent laminate, and a plurality of metal domes installed on another side of the luminescent laminate and corresponding to the protrusions.

9. The thin keypad panel assembly of claim 8, wherein the luminescent laminate is an electro luminescent panel.

10. The thin keypad panel assembly of claim 8, further comprising a flexible printed circuit board installed under the light emitting layer.

11. A thin keypad panel assembly, comprising:
    an elastic layer, having a plurality of support portions disposed thereon, and a protrusion disposed between the support portions;
    a carrier, disposed on a surface of the elastic layer, and a joint surface of the carrier and the elastic layer joint surface has a metal dome with a ground color layer, and the ground color layer has a function color layer disposed thereon, and the ground color layer and the function color layer have a font color layer; and
    a keypad layer, disposed on surface of the carrier and having a lines layer disposed on the surface of the keypad layer.

12. The thin keypad panel assembly of claim 11, wherein the elastic layer is made of silicon.

13. The thin keypad panel assembly of claim 11, wherein the carrier is a transparent Polycarbonate film.

14. The thin keypad panel assembly of claim 11, wherein the ground color layer is a black ink, and the ground color layer forms a pattern of hollow characters, numbers or different symbols.

15. The thin keypad panel assembly of claim 11, wherein the function color layer is disposed on the pattern of a dialing key.

16. The thin keypad panel assembly of claim 11, wherein the function color layer is disposed on the pattern of an end key.

17. The thin keypad panel assembly of claim 11, wherein the font color layer is disposed on the pattern of hollow characters, numbers or different symbols.

18. The thin keypad panel assembly of claim 11, wherein the lines layer is a spinning, a straight stripe or an Archimedean screw.

19. The thin keypad panel assembly of claim 11, wherein the keypad layer has a holder disposed on a surface of the carrier, and the holder has a plurality of keycaps protruded from the surface of the holder, and the surfaces of the keycap and the holder have a lines layer.

20. The thin keypad panel assembly of claim 19, wherein the lines layer is a spinning, a straight stripe or an Archimedean screw.

21. The thin keypad panel assembly of claim 11, wherein the keypad layer has a lines layer disposed on a surface of the keypad layer and corresponding to the position of the keycap.

22. The thin keypad panel assembly of claim 21, wherein the lines layer is a spinning, a straight stripe or an Archimedean screw.

23. The thin keypad panel assembly of claim 11, further comprising a light emitting layer installed under the elastic layer and having a luminescent laminate, and a plurality of metal domes installed on another side of the luminescent laminate and corresponding to the protrusions.

24. The thin keypad panel assembly of claim 11, wherein the luminescent laminate is an electro luminescent panel.

25. The thin keypad panel assembly of claim 11, further comprising a flexible printed circuit board installed under the light emitting layer.

* * * * *